United States Patent
Lee

(10) Patent No.: US 9,055,636 B2
(45) Date of Patent: Jun. 9, 2015

(54) LIGHT SOURCE DRIVING DEVICE AND ILLUMINATING APPARATUS USING THE SAME

(71) Applicant: SAMSUNG ELECTRONICS CO., LTD., Suwon-si, Gyeonggi-do (KR)

(72) Inventor: Bong Jin Lee, Hwaseong-si (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 0 days.

(21) Appl. No.: 14/034,324

(22) Filed: Sep. 23, 2013

(65) Prior Publication Data

US 2014/0084799 A1  Mar. 27, 2014

(30) Foreign Application Priority Data

Sep. 24, 2012  (KR) .................. 10-2012-0106041

(51) Int. Cl.
  H05B 37/00  (2006.01)
  H05B 39/00  (2006.01)
  H05B 41/14  (2006.01)
  H05B 33/08  (2006.01)

(52) U.S. Cl.
  CPC .................................. *H05B 33/0815* (2013.01)

(58) Field of Classification Search
  None
  See application file for complete search history.

(56) References Cited

U.S. PATENT DOCUMENTS

| 7,759,880 B2 | 7/2010 | Maros et al. |
| 8,120,278 B2 | 2/2012 | Choi et al. |
| 8,125,158 B2 | 2/2012 | Nishino et al. |
| 2003/0102810 A1 | 6/2003 | Cross et al. |
| 2004/0012959 A1 | 1/2004 | Robertson et al. |
| 2010/0194296 A1 | 8/2010 | Park |
| 2010/0270941 A1 | 10/2010 | Hui |
| 2012/0161666 A1 | 6/2012 | Antony et al. |
| 2012/0181952 A1 | 7/2012 | Roeer |
| 2014/0070714 A1 | 3/2014 | Lee et al. |
| 2014/0204571 A1* | 7/2014 | Zhang et al. .................. 362/222 |

FOREIGN PATENT DOCUMENTS

| CN | 102348319 A | 2/2012 |
| CN | 102573166 A | 7/2012 |

(Continued)

OTHER PUBLICATIONS

United Kingdom Search Report issued in Application No. GB 1316873.7 dated Feb. 9, 2014.

(Continued)

*Primary Examiner* — Jany Richardson
(74) *Attorney, Agent, or Firm* — McDermott Will & Emery LLP

(57) ABSTRACT

A light source driving device includes a transformer, a rectifying diode, a filter, and an open loop preventing circuit. The transformer has a primary winding part including first and second external input terminals configured to receive external power from a ballast stabilizer and a coil having an impedance level set to allow the ballast stabilizer to output a normal amount of power, and a secondary winding part electromagnetically coupled to the primary winding part to transform received external power. The rectifying diode rectifies power from the secondary winding part, and the filter filters the rectified power from the rectifying diode. The open loop preventing circuit provides a closed loop to the filter such that power stored in the filter is applied to the output terminal when the rectifying diode is turned off.

19 Claims, 8 Drawing Sheets

(56) References Cited

FOREIGN PATENT DOCUMENTS

| | | |
|---|---|---|
| DE | 102010003266 A1 | 9/2011 |
| EP | 2469984 A2 | 6/2012 |
| KR | 10-0980032 B1 | 9/2010 |
| KR | 10-0996670 B1 | 11/2010 |
| KR | 10-2011-0032435 A | 3/2011 |
| KR | 10-2011-0062243 A | 6/2011 |
| KR | 10-2011-0067212 A | 6/2011 |
| KR | 10-2011-0084606 A | 7/2011 |
| KR | 10-1073289 B1 | 10/2011 |
| KR | 10-1091046 | 12/2011 |
| KR | 10-1102781 B1 | 1/2012 |
| KR | 10-1144629 B1 | 5/2012 |
| WO | 2009-010802 A2 | 1/2009 |
| WO | 2011/155712 A9 | 12/2011 |
| WO | 2011/159048 A9 | 12/2011 |
| WO | 2012/050348 | 4/2012 |

OTHER PUBLICATIONS

German Decision of Grant issued in German Application No. 102013110327.8 dated Aug. 19, 2014, w/English translation.

U.S. Office Action issued in U.S. Appl. No. 14/053,377 dated Sep. 30, 2014.

Chinese Office Action issued in Chinese Application No. 201310449412.9, dated Mar. 18, 2015.

* cited by examiner

LIGHT SOURCE DRIVING DEVICE AND ILLUMINATING APPARATUS USING THE SAME

CROSS-REFERENCE TO RELATED APPLICATIONS

This application claims priority to, and the benefit of, Korean Patent Application No. 10-2012-0106041 filed on Sep. 24, 2012, with the Korean Intellectual Property Office, the disclosure of which is incorporated herein by reference.

TECHNICAL FIELD

The present inventive concepts relate to a light source driving device and an illuminating apparatus using the same.

BACKGROUND

A light emitting diode (LED) is driven by direct current (DC) power. Hence, in order to substitutively employ an LED illuminating apparatus as a light source in a lamp driven by alternating current (AC) power, a driving device is required. In addition, a ballast stabilizer for a fluorescent lamp outputs an appropriate amount of power for driving a fluorescent lamp. Hence, if an LED illuminating apparatus exhibiting electrical characteristics different from those of a fluorescent lamp is used, the LED illuminating apparatus may not operate normally or a device component may be damaged. As a solution thereto, a ballast stabilizer installed in a fluorescent lamp is removed and a power supplier for an LED illuminating apparatus is installed instead. Thus, a light source driving device, allowing for compatibility between a ballast stabilizer for a fluorescent lamp and an LED illuminating apparatus is required.

SUMMARY

An aspect of the present inventive concepts provides a light source driving device compatible with a ballast stabilizer for a fluorescent lamp.

An aspect of the present inventive concepts provides an illuminating apparatus using the foregoing light source driving device.

According to an aspect of the present inventive concepts, there is provided a light source driving device comprising: a transformer including a primary winding part including first and second external input terminals configured to receive external power from a ballast stabilizer and a coil having an impedance level set to allow the ballast stabilizer to output a normal amount of power, and a secondary winding part electromagnetically coupled to the primary winding part to transform the received external power; a rectifying diode rectifying output power from the secondary winding part of the transformer; a filter having an input terminal and an output terminal outputting light source driving power, configured to deliver rectified power received from the rectifying diode at the input terminal when the rectifying diode is turned on to the output terminal thereof, and storing a partial amount of the rectified power; and an open loop preventing circuit providing a closed loop to the filter such that power stored in the filter is applied to the output terminal when the rectifying diode is turned off.

An impedance level of the coil set to allow the ballast stabilizer to output a normal amount of power may be obtained by using Equation 1:

$$Z_x = \frac{V_{lamp}}{I_{lamp}} \quad \text{[Equation 1]}$$

where $V_{lamp}$ is a voltage output when the ballast stabilizer is in a normal power output state, and $I_{lamp}$ is a current output when the ballast stabilizer is in a normal power output state.

Impedance of the coil may range from about 700Ω to about 800Ω.

The filter may be a low pass filter (LPF).

The open loop preventing circuit may include a free-wheeling diode.

The light source driving device may further include: a thermistor connected to at least one of the first and second external input terminals of the primary winding part so as to be connected in series with the primary winding part.

The light source driving device may further include: a switch connected in parallel with the thermistor.

The light source driving device may further include: a resistor connected to the external input terminal of the primary winding part so as to be connected in series with the primary winding part; and a switch connected in parallel with the resistor, wherein impedance of the resistor may be set to allow the ballast stabilizer to output ignition power.

The primary winding part may further include: third and fourth external input terminals, and first and second potential difference generating circuits respectively generating a potential difference between the respectively generating a potential difference between the first and third external input terminals and a potential difference between the second and fourth external input terminals.

The first and second potential difference generating circuits may be first and second sub-coils, respectively.

The light source driving device may further include: a DC/DC converter receiving light source driving power from an output terminal of the filter and outputting regulated light source driving power.

The DC/DC converter may be configured according to any one of boost, buck, buck-boost, and flyback schemes.

The light source driving device may further include: a linear regulator receiving light source driving power from the output terminal of the filter and outputting regulated light source driving power.

According to an aspect of the present inventive concept, there is provided an illuminating apparatus including: a socket including an input terminal receiving external power from a ballast stabilizer; a housing coupled to the socket; a plate installed within the housing and including a light source driving device; and a light source mounted on the plate and including at least one light emitting diode (LED) receiving light source driving power from the light source driving device, wherein the light source driving device includes: a transformer including a primary winding part including first and second external input terminals configured to receive external power from the socket and a coil having an impedance level set to allow the ballast stabilizer to output a normal amount of power, and a secondary winding part electromagnetically coupled to the primary winding part to transform the received external power; a rectifying diode rectifying output power from the secondary winding part of the transformer; a filter having an input terminal and an output terminal outputting light source driving power, configured to deliver rectified power received from the rectifying diode at the input terminal thereof when the rectifying diode is turned on to the output terminal thereof, and storing a partial amount of the rectified power; and an open loop preventing circuit providing a closed loop to the filter such that power stored in the filter is applied to the output terminal when the rectifying diode is turned off.

The socket may include two input terminals and disposed in each of two end portions of the illuminating apparatus.

According to another aspect of the present inventive concept, there is further provided a light source driving device for driving at least one light emitting diode (LED) using external alternating current (AC) power received from a ballast stabilizer configured for driving a fluorescent lamp. The light source driving device includes: a transformer circuit configured to receive the external AC power from the ballast stabilizer, and to output transformed AC power having reduced voltage amplitude for driving the at least one LED, wherein the transformer has a variable input impedance configured to have a high input impedance value at a time of initial driving of the transformer circuit by the ballast stabilizer and to decrease from the high input impedance value following the time of initial driving; a rectifying diode configured to rectify the transformed AC power output from the transformer circuit into rectified direct current (DC) power; and a filter configured to low pass filter the rectified DC power from the rectifying diode, and to drive the at least one LED with the filtered rectified DC power.

The transformer may include an input winding configured to receive the external AC power from the ballast stabilizer, and an output winding magnetically coupled to the input winding and configured to output the transformed AC power having reduced voltage amplitude for driving the at least one LED.

The filter may include a series interconnection of an inductor and a capacitor, and the filter may drive the at least one LED with a voltage across the capacitor. In one example, the filter further includes a diode electrically connected across the series interconnection of the inductor and the capacitor The foregoing technical solutions do not fully enumerate all of the features of the present inventive concepts. The foregoing and other objects, features, aspects and advantages of the present inventive concepts will become more apparent from the following detailed description of the present inventive concepts when taken in conjunction with the accompanying drawings.

BRIEF DESCRIPTION OF THE DRAWINGS

The above and other aspects, features and other advantages of the present inventive concept will be more clearly understood from the following detailed description taken in conjunction with the accompanying drawings, in which.

DETAILED DESCRIPTION OF THE PREFERRED EMBODIMENT

Figure 1:
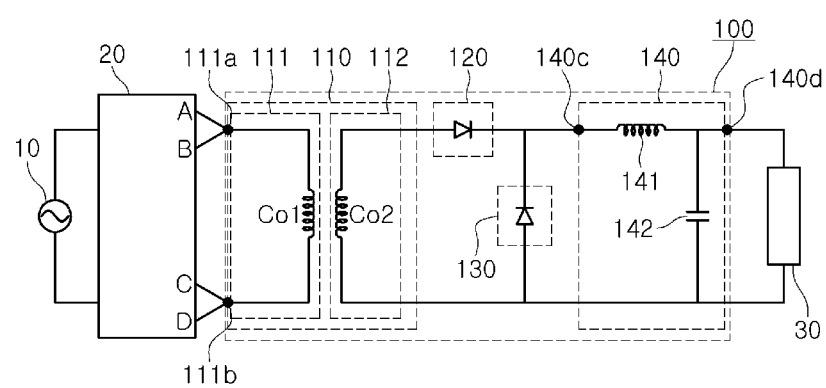
FIG. 1 is a circuit diagram of a light source driving device according to an embodiment of the present inventive concepts.

Embodiments of the present inventive concepts will now be described in detail with reference to the accompanying drawings.

The inventive concepts may, however, be embodied in many different forms and should not be construed as being limited to the embodiments set forth herein. Rather, these embodiments are provided so that this disclosure will be thorough and complete and will fully convey the scope of the inventive concepts to those skilled in the art. In the drawings, the shapes and dimensions of elements may be exaggerated for clarity, and the same reference numerals will be used throughout to designate the same or like components.

FIG. 1 is a circuit diagram of a light source driving device according to an embodiment of the present inventive concepts.

Referring to FIG. 1, a light source driving device 100 according to an embodiment of the present inventive concepts includes a transformer unit 110 including a primary winding part 111 and a secondary winding part 112, a rectifying diode configured to rectify output power from the secondary winding part 112 of the transformer unit 110, a filter unit 140 having an input terminal 140c and an output terminal 140d, and an open loop preventing unit 130 providing a closed loop to the filter unit 140 when the rectifying diode 120 is turned off.

The primary winding part 111 of the transformer unit 110 may include first and second external input terminals 111a and 111b that receive external power through a ballast stabilizer 20 from an external power source 10. The ballast stabilizer 20 has first to fourth output terminals A, B, C, and D, and the external input terminals 111a and 111b may receive the external power respectively from a short-circuit interconnection of the first and second output terminals A and B and from a short-circuit interconnection of the third and fourth output terminals C and D of the ballast stabilizer 20.

In order to stably drive a fluorescent lamp, the ballast stabilizer 20 receives the external power, converts the received external power in consideration of electrical characteristics of a general fluorescent lamp, and outputs the converted power to the fluorescent lamp. The ballast stabilizer 20 may be installed in general lighting equipment for a fluorescent lamp. Hereinafter, the ballast stabilizer 20 will be described in detail. However, it is described to help clearly understand the present inventive concepts and the ballast stabilizer 20 mentioned in the present embodiment is not limited to the description below.

In general, a fluorescent lamp may have high impedance or low impedance according to whether or not the fluorescent lamp is discharged. In detail, the fluorescent lamp takes on insulation characteristics in a state before being lighted, and in this case, the fluorescent lamp has high impedance, e.g., very high impedance ranging from tens of kΩ to hundreds of kΩ. When a high voltage is applied to the fluorescent lamp so as to cause the lamp to discharge and to reach a lit state, the fluorescent lamp forms a channel through which a current flows and exhibits low impedance. For example, low impedance may range from about 700Ω to about 800Ω.

In consideration of the electrical characteristics of the fluorescent lamp, the ballast stabilizer 20 may selectively output ignition power and/or normal power. In detail, the ballast stabilizer 20 may be an electronic ballast stabilizer and may include a power factor correction circuit and an inverter. The inverter can be implemented as an LLC resonance inverter, a full-bridge inverter, or a half-bridge inverter. When input impedance of the fluorescent lamp corresponds to a high impedance value of the fluorescent lamp, the ballast stabilizer 20 may recognize that fluorescent lamp is in a state before being lighted and may output ignition power having a high voltage for initial discharge. A voltage value of the ignition power may range from about 500V to 1 kV. In contrast, when input impedance of the fluorescent lamp to the ballast stabilizer corresponds to a low impedance value of the fluorescent lamp, the ballast stabilizer 20 may recognize that the fluorescent lamp is in a lit state and may output a normal amount of power. Here, a voltage value of the normal power may range from 100V to 300V, for example.

When a light source driving device employing an LED as a light source is connected to the ballast stabilizer 20, the impedance of the light source driving device is recognized by the ballast stabilizer 20 as being different from the impedance of a fluorescent lamp so the ballast stabilizer 20 may malfunction. For example, the ballast stabilizer 20 may not output power or may output ignition power continuously. In this case, the light source driving device may not be normally driven and/or may be damaged.

Thus, according to an embodiment of the present inventive concepts, a coil Co1 of the primary winding part 111 may have an impedance that is matched to the impedance of a fluorescent lamp in a lit state. Namely, the coil Co1 may be selected to have an impedance set to cause the ballast stabilizer 20 to determine that a fluorescent light in a lit state is connected to the ballast stabilizer 20, and to cause the ballast stabilizer 20 to output a normal amount of power.

A voltage and a current output when the ballast stabilizer 20 is in a state of outputting normal power are defined as $V_{lamp}$ and $I_{lamp}$, respectively. An impedance $Z_x$ set to allow the ballast stabilizer 20 to output a normal amount of power may be obtained from Equation 1:

$$Z_x = \frac{V_{lamp}}{I_{lamp}} \qquad [\text{Equation 1}]$$

The impedance $Z_x$ may have a value ranging from about 700Ω to about 800Ω, for example, but the present inventive concepts are not limited thereto.

The coil Co1 of the primary winding part 111 may be set to have an inductance $L_x$ calculated by Equation 2:

$$L_x = \frac{Z_x}{2\pi \cdot f_a}, \qquad [\text{Equation 2}]$$

where $Z_x$ is the impedance set to allow the ballast stabilizer 20 to output a normal amount of power, and $f_a$ is a frequency of the external power output from the ballast stabilizer 20 after being modulated.

The transformer unit 110 may include the secondary winding part 112 electromagnetically coupled to the primary winding part 111. The secondary winding part 112 may transform the external power received from the ballast stabilizer 20 through the external input terminals 111a and 111b of the primary winding part 111. Namely, the external power received from the ballast stabilizer 20 may have a voltage having a magnitude inappropriate for driving a light source using an LED. Therefore, the secondary winding part 112 may transform the external power received from the ballast stabilizer 20 into power having a magnitude appropriate for an LED light source (hereinafter, referred to as an 'external light source 30') employable in the light source driving device 100 according to an embodiment of the present inventive concepts. Also, the secondary winding part 112 prevents the external power source 10 from being directly connected to the external light source 30, and thereby protects the light source driving device 100.

The rectifying diode 120 half-wave rectifies power received from the secondary winding part 112 of the transformer unit 110, and transfers the half-wave rectified power to an input terminal 140c of the filter unit 140.

The filter unit 140 receives the rectified power from the rectifying diode 120 at input terminal 140c thereof, and provides a light source driving voltage for driving the external light source 30 to an output terminal 140d thereof. The filter unit 140 may serve to reduce noise and a ripple voltage of the light source driving power.

For example, the filter unit 140 may include an inductor 141 and a capacitor 142 configured to transfer light source driving power to the output terminal 140d. The filter unit 140 may buffer current and voltage fluctuations of the light source driving power prior to the transfer to the output terminal 140d. Namely, the filter unit 140 transfers power, which has been applied to the input terminal 140c when the rectifying diode 120 is turned on, to the output terminal 140d. The filter unit 140 further stores a partial amount of power applied to the input terminal 140c, and when the rectifying diode 120 is turned off, the filter unit 140 may apply the power stored therein to the output terminal 140d. A detailed operation of the filter unit 140 will be described together with the open loop preventing unit 130. Meanwhile, referring to the embodiment of FIG. 1, the filter unit 140 is implemented as a low pass filter (LPF), but the present inventive concept is not limited thereto.

The open loop preventing unit 130 provides a closed loop in the filter unit 140 when the rectifying diode 120 is turned off. The open loop preventing unit 130 may include a freewheeling diode. An operation of the open loop preventing unit 130 will be described with reference to FIGS. 2A through 2C.

Figure 2A:
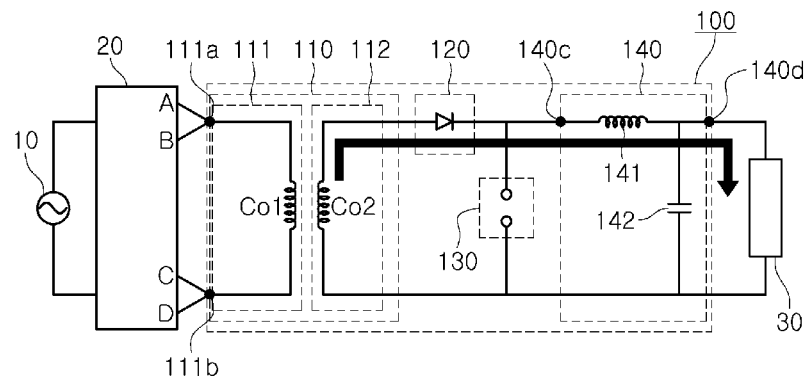
FIGS. 2A through 2C are circuit diagrams illustrating operational states of the light source driving device according to an embodiment of the present inventive concepts.
Figure 2B:
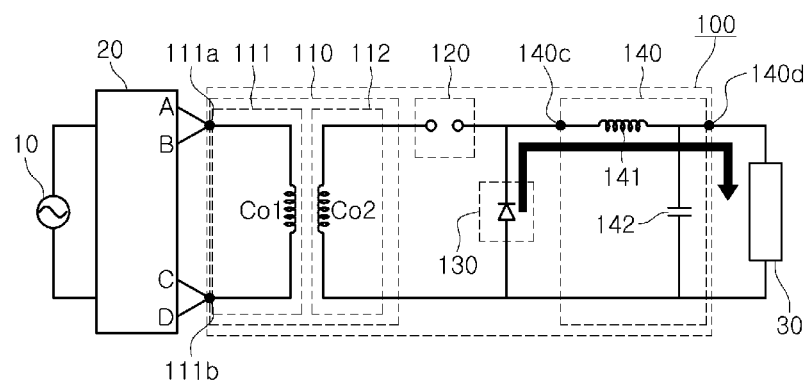
Figure 2C:
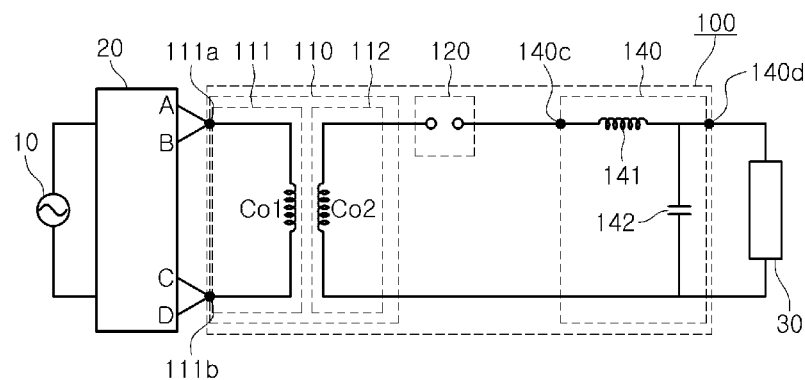

FIGS. 2A through 2C are circuit diagrams illustrating operational states of the light source driving device 100 according to an embodiment of the present inventive concepts. Specifically, FIGS. 2A through 2C are circuit diagrams illustrating operational states according to the conductive state (turned-on or turned-off) of the rectifying diode 120.

Referring to FIG. 2A, when a direction of a voltage of output power from the secondary winding part 112 is a clockwise direction, the rectifying diode 120 is turned on and the filter unit 140 forms a closed loop with the secondary winding part 112 to supply light source driving power to the external light source 30.

Meanwhile, when a direction of the voltage of the output power from the secondary winding part 112 is a counterclockwise direction, the rectifying diode 120 is turned off. In this case, as illustrated in FIG. 2C, the filter unit 140 is electrically separated from the secondary winding part 112 and cannot receive output power from the secondary winding part 112 for applying light source driving power to the external light source 30. Also, since an open loop is formed, it is difficult to supply the light source driving power stored in the filter unit 140 when the rectifying diode 120 is turned on to the external light source 30.

Thus, in an embodiment of the present inventive concepts, the open loop preventing unit 130 is provided. Referring to FIG. 2B, when the rectifying diode 120 is turned off, the open loop preventing unit 130 provides a closed loop in the filter unit 140. Thus, when the rectifying diode 120 is turned off, the filter unit 140 may supply power stored therein to the external light source 30.

According to the present disclosure, light source driving devices directly compatible with ballast stabilizers are provided.

Figure 3:
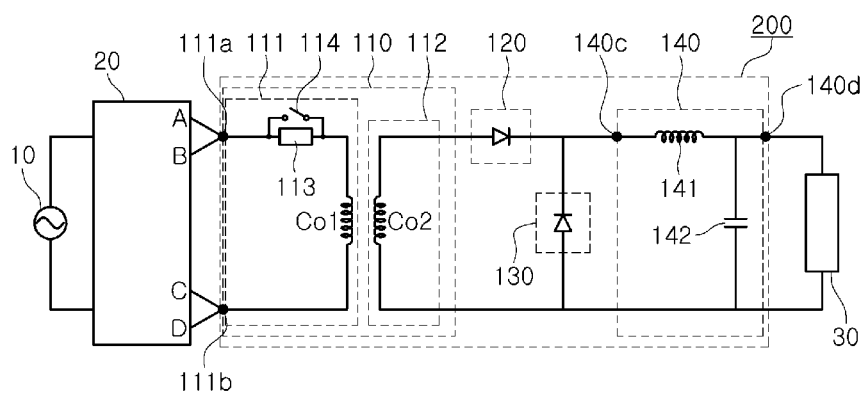
FIGS. 3 through 7 are circuit diagrams illustrating light source driving devices according to different embodiments of the present inventive concepts.
Figure 4:
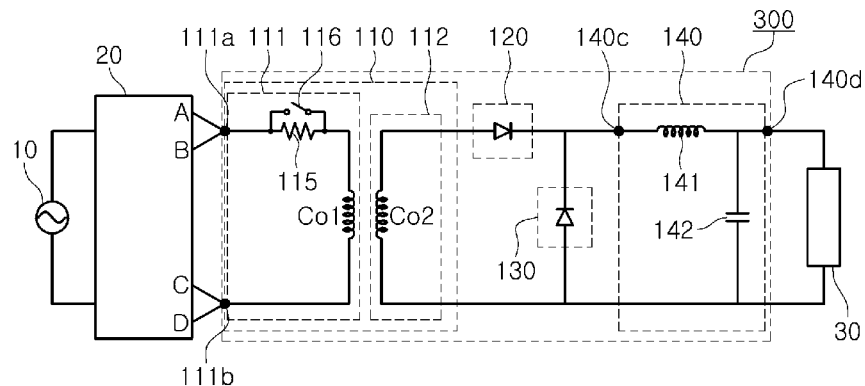

FIGS. 3 and 4 are circuit diagrams illustrating light source driving devices according to different embodiments of the present inventive concepts.

The ballast stabilizer 20 may be required to be compatible with lighting devices having high input impedance such as the input impedance of a fluorescent light before the fluorescent light is lighted. In operation, the ballast stabilizer 20 may monitor a voltage of an output terminal of the ballast stabilizer 20. When ignition power is not detected at the time of initial driving, the ballast stabilizer 20 may determine that the fluorescent lamp has an error and may not output power or may continuously output ignition power. In order to be compatible with the ballast stabilizer 20, the light source driving device may have an impedance set such that the ballast stabilizer 20 outputs ignition power at the time of initial driving. Namely, the light source driving device may have an input impedance as high as the impedance of a fluorescent light before the fluorescent lamp is lighted.

Referring to FIG. 3, the light source driving device 200 further includes a thermistor 113 connected to at least one of the first and second external input terminals 111a and 111b of the primary winding part 111. The thermistor 113 is connected in series with the coil Co1.

As the thermistor 113, an NTC (Negative Temperature Coefficient) thermistor may be used. The NTC thermistor has high impedance at a low temperature condition and the impedance is reduced according to an increase in temperature. Thus, at the time of initial driving, the sum of impedance of the coil Co1 of the primary winding part 111 and impedance of the NTC thermistor may be adjusted to match the high input impedance of a fluorescent lamp before the fluorescent lamp is lighted, to thus allow the ballast stabilizer 20 to output ignition power.

Here, a majority of a high voltage of the ignition power is applied to the thermistor 113 according to a voltage distribution principle. Hence, although ignition power is applied to the light source driving device 200, the light source driving device 200 and the external light source 30 can be protected from the high voltage.

In the case of using an NTC thermistor, as driving starts, the temperature of thermistor 113 increases and the thermistor's impedance decreases. Thus, the sum of the impedance of the primary winding part coil Co1 and the impedance of the thermistor 113 may decrease sufficiently so as to reach a value set for the ballast stabilizer 20 to output a normal amount of power. When the impedance value for normal operation is reached, the ballast stabilizer 20 outputs normal power.

Meanwhile, the light source driving device according to the present embodiment may further include a switching unit 114 connected in parallel with the thermistor 113. Although impedance of the thermistor 113 is gradually reduced to reach a state in which the ballast stabilizer 20 outputs normal power, the thermistor 113 still has a non-zero impedance when its temperature is elevated, thereby unnecessarily consuming power. Thus, the switching unit 114 connected in parallel with the thermistor 113 may be further provided. When the ballast stabilizer 20 outputs normal power, the switching unit 114 may be switched on to bypass the thermistor 113 and remove power consumed in the thermistor 113.

In detail, the switching unit 114 may be switched off when a potential difference between both ends of the thermistor 113 is greater than a pre-set value (i.e., the switching unit 114 may be open), and may be switched on when the potential difference between both ends of the thermistor 113 is smaller than the pre-set value (i.e., the switching unit 114 may be closed to enable current flow therethrough). Alternatively, the switching unit 114 may be switched off during a pre-set period of time or may be switched on when the pre-set period of time has lapsed. However, the present inventive concept is not limited thereto.

FIG. 4 illustrates an embodiment in which the thermistor 113 is replaced by a resistor unit 115 and a switching unit 116 is connected in parallel with the resistor unit 115. Referring to FIG. 4, the light source driving device 300 may include the resistor unit 115 connected in series with the coil Co1 between the external input terminals 111a and 111b of the primary winding part 111, and the switching unit 116 connected in parallel with the resistor unit 115.

The impedance of the resistor unit 115 may be set to allow or cause the ballast stabilizer 20 to output ignition power. For example, the resistor unit 115 may have impedance ranging from tens of kΩ to hundreds of kΩ (e.g., 10 kΩ to 900 kΩ). The switching unit 116 may be switched off (i.e., placed in a non-conducting state) when a potential difference between both ends of the resistor unit 115 is greater than a pre-set value and may be switched on (i.e., placed in a conducting state) when the potential difference between both ends of the resistor unit 115 is smaller than the pre-set value. Alternatively, the switching unit 116 may be switched off during a pre-set period of time or may be switched on when the pre-set period of time has lapsed.

Figure 5:
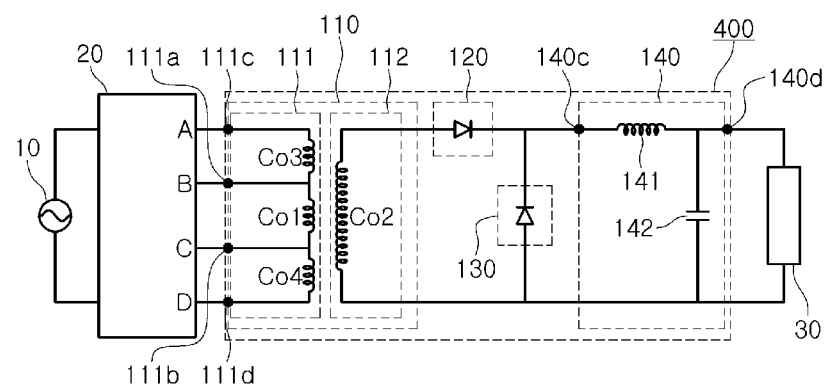

FIG. 5 is a circuit diagram illustrating a light source driving device 400 according to a different embodiment of the present inventive concepts.

The ballast stabilizer 20 may monitor a voltage between the first and second output terminals A and B and a voltage between the third and fourth output terminals C and D. The ballast stabilizer 20 may monitor for a predetermined potential difference, e.g., a potential difference of approximately 10V, according to types. Namely, such a configuration is based on a consideration of a filament installed in an electrode of a fluorescent lamp. When a predetermined potential difference between the first and second output terminals A and B and a predetermined potential difference between the third and fourth output terminals C and D do not reach the predetermined potential difference, the ballast stabilizer 20 may recognize that the filament of the fluorescent lamp has an error and may malfunction such as not outputting power.

Thus, referring to FIG. 5, the primary winding part 111 of the light source driving device 400 according to the present embodiment further includes third and fourth external input terminals 111c and 111d, and may further include first and second potential difference generating units generating a potential difference between the first external input terminal 111a and the third external input terminal 111c and between the second external input terminal 111b and the fourth external input terminal 111d. In the present embodiment, the first and second potential difference generating units may be configured as coils, respectively (hereinafter, respectively referred to as 'first and second sub-coils Co3 and Co4'). However, the present inventive concepts are not limited thereto, and any means may correspond to the potential difference generating units according to the present embodiment as long as a potential difference may be generated between the first external input terminal 111a and the third external input terminal 111c and between the second external input terminal 111b and the fourth external input terminal 111d.

The first, second, third, and fourth external input terminals 111a, 111b, 111c, and 111d may respectively be connected to the second, third, first, and fourth output terminals B, C, A, and D, and the first sub-coil Co3 disposed between the first external input terminal 111a and the third external input terminal 111c may generate a potential difference between the first and second output terminals A and B of the ballast stabilizer 20. Also, the second sub-coil Co4 disposed between the second external input terminal 111b and the fourth external input terminal 111d may generate a potential difference between the third and fourth output terminals C and D of the ballast stabilizer 20, so that the ballast stabilizer 20 may not malfunction.

Also, when the potential difference generating units are implemented as sub-coils according to the present embodiment, the coil Co2 formed in the secondary winding part 112 of the transformer unit 110 may be electromagnetically coupled to the first sub-coil Co3, the second sub-coil Co4, and the coil Co1. The coil Co2 may have an impedance level set to allow the ballast stabilizer 20 to output a normal amount of power to transform the applied external power, and in this case transformation efficiency can be increased.

Figure 6:
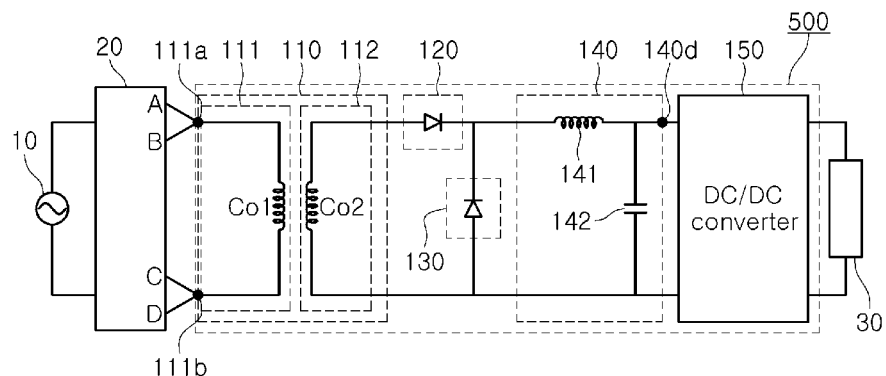
Figure 7:
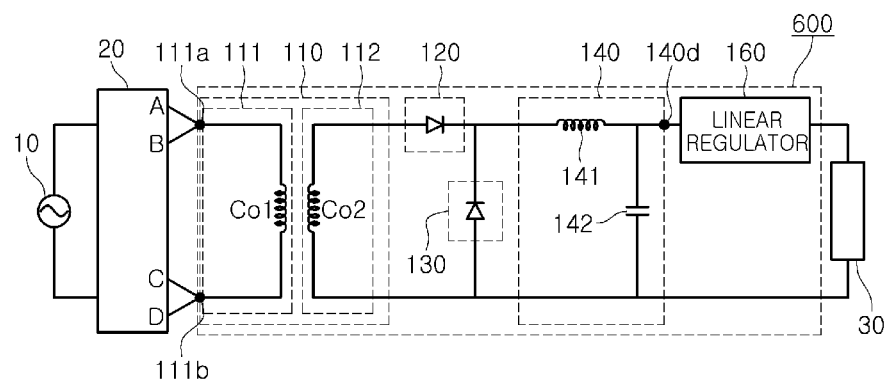

FIGS. 6 and 7 are circuit diagrams illustrating light source driving devices according to different embodiments of the present inventive concepts.

Referring to FIG. 6, a light source driving device 500 further includes a DC/DC converter 150 receiving light source driving power from the output terminal 140d of the filter unit 140 and outputting regulated light source driving power to the external light source 30. The DC/DC converter 150 may be configured according to any one of schemes such as boost, buck, buck-boost, and flyback, but the present inventive concept is not limited thereto.

Referring to FIG. 7, a light source driving device 600 further includes a linear regulator 160 receiving light source driving power from the output terminal 140d of the filter unit 140 and outputting regulated light source driving power to the external light source 30.

The light source driving devices according to the embodiments of FIGS. 6 and 7 may be able to output regulated light source driving power by which the external light source 30 can be effectively driven.

FIGS. 8A, 8B, 9A, and 9B are graphs showing operation performance of the light source driving device according to an embodiment of the present inventive concept.

In FIGS. 8A, 8B, 9A, and 9B, K represents a voltage output by the ballast stabilizer, L represents a voltage of light source driving power output by the light source driving device, and M represents a current of light source driving power output by the light source driving device.

Figure 8A:
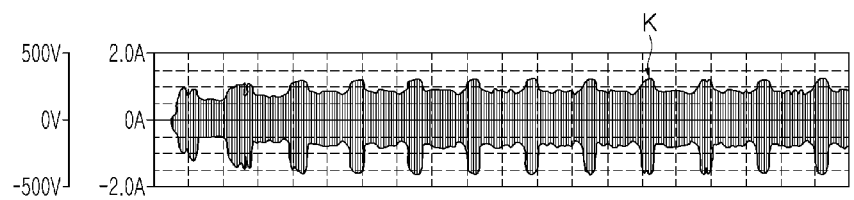
FIGS. 8A and 8B are graphs showing operation performance of the light source driving device according to the embodiment of FIG. 1.
Figure 8B:
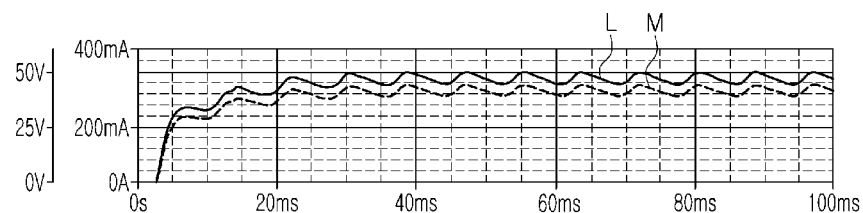

First, FIGS. 8A and 8B are graphs showing operations of the light source driving device 100 according to the embodiment of FIG. 1. FIGS. 8A and 8B have the same x-axis scale.

Referring to FIG. 8A, it can be seen that the ballast stabilizer outputs normal power having a voltage of a maximum of about 250V. Thus, light source driving power output by the light source driving device 100 is measured as shown in FIG. 8B. According to FIG. 8B, a voltage of the light source driving power is measured to be about 45V, but this may be a feature that can be easily changed through design by setting a winding ratio between coils Co1 and Co2 of the primary winding part and the secondary winding part.

Figure 9A:
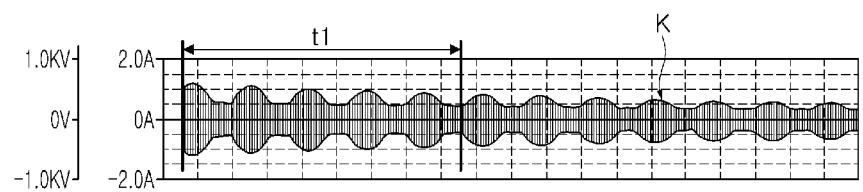
FIGS. 9A and 9B are graphs showing operation performance of the light source driving device according to the embodiment of FIG. 3.
Figure 9B:
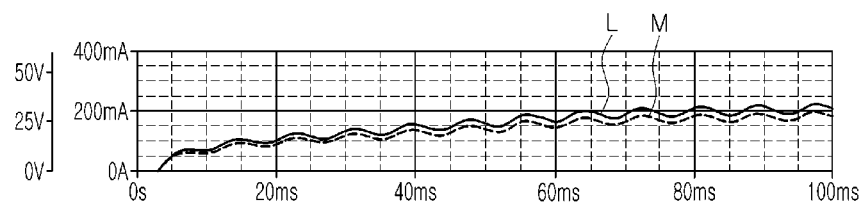

FIGS. 9A and 9B are graphs showing operations of the light source driving device 200 according to the embodiment of FIG. 3. FIGS. 9A and 9B have the same x-axis scale. In this case, the operations correspond to a case in which the switching unit 114 connected to the thermistor 113 in parallel is not included in the embodiment of FIG. 3.

Referring to FIG. 9A, it can be seen that the ballast stabilizer outputs ignition power (t1 section) at the time of initial driving, and as impedance of the thermistor is decreased, the ballast stabilizer subsequently outputs normal power (following the end of the t1 section). Thus, light source driving power output by the light source driving device 200 is measured as shown in FIG. 9B. Referring to FIG. 9B, it can be seen that, although ignition power is input, stable light source driving power is output.

Figure 10:
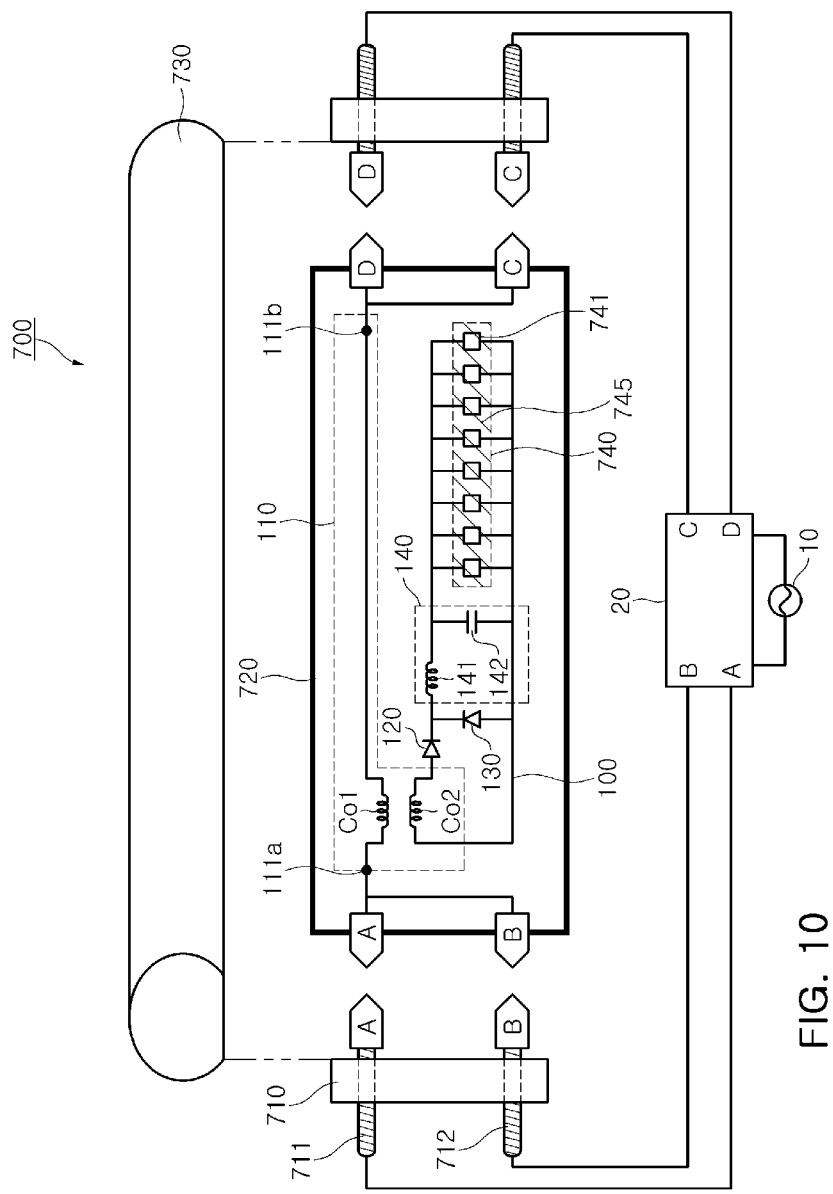
FIG. 10 is a view illustrating an illuminating apparatus according to an embodiment of the present inventive concepts.
Figure 11:
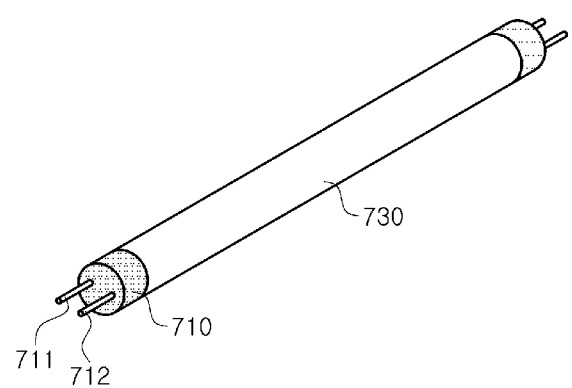
FIG. 11 is a perspective view illustrating an assembled state of the illuminating apparatus of FIG. 10.

FIG. 10 is a view illustrating an illuminating apparatus according to an embodiment of the present inventive concepts, and FIG. 11 is a perspective view illustrating an assembled state of the illuminating apparatus of FIG. 10.

Referring to FIG. 10, an illuminating apparatus 700 according to an embodiment of the present inventive concepts includes a socket 710 including an input terminal for receiving external power from the ballast stabilizer 20, a housing 730 coupled to the socket 710, a plate 720 installed within the housing 730 and including a light source driving device, and a light source unit 740 mounted on the plate 720.

The socket 710 includes two input terminals 711 and 712 and may be formed in both end portions of the illuminating apparatus 700. In this case, a total of four input terminals 711 and 712 are provided in the socket 710 and electrically connected to correspond to the first to fourth output terminals A, B, C, and D, respectively. However, the present inventive concepts are not limited thereto and configurations of the socket 710 may be variously modified.

The housing 730, serving to protect the light source unit 740 and the light source driving device 100 against the outside, may be made of a transparent or translucent material to allow light output from the light source unit 740 to be emitted outwardly therethrough. Also, the housing 730 may have a bar-like shape to provide an exterior similar to that of a general fluorescent lamp.

The light source unit 740 may include at least one light emitting diode (LED) 741 receiving light source driving power from the light source driving device 100. More generally, the light source unit 740 includes a plurality of light emitting diodes 741. A wavelength conversion unit 745 can optionally be disposed on the LED(s) 741. The wavelength conversion unit 745 may include a wavelength conversion material excited by light output from the LED(s) 741 to emit light having a converted wavelength.

The plate 720 is provided in a region in which the light source unit 740 is mounted. The plate 720 may be made of a metal having high heat conduction quality to enhance an efficiency of heat dissipation and the plate 720 may have reflective characteristic to enhance a light emitting efficiency.

The light source driving device 100 includes the transformer unit 110 including the coil Co1 of the primary winding part and the coil Co2 of the secondary winding part electromagnetically coupled to coil Co1 of the primary winding part and transforming the applied external power, the rectifying diode 120 rectifying output power from the coil Co2 of the secondary winding part of the transformer unit 110, the filter unit 140 having the input terminal and the output terminal outputting light source driving power, delivering rectified power, received from the input terminal from the rectifying diode 120 when the rectifying diode 120 is turned on, to the output terminal, and storing a partial amount of the rectified power, and an open loop preventing unit 130 providing a closed loop to the filter unit 140 such that the power stored in the filter unit 140 may be applied to the output terminal when the rectifying diode 120 is turned off.

Here, the coil Co1 of the primary winding part includes external input terminals 111a and 111b receiving external power from the socket 710. The coil Co1 of the primary winding part may have impedance selected to allow the ballast stabilizer 20 to output a normal amount of power. Namely, the present embodiment may be understood as an illuminating apparatus 700 including the light source driving device 100 of FIG. 1.

According to the present embodiment, an illuminating apparatus using a light source driving device that is directly compatible with a ballast stabilizer can be obtained.

As set forth above, according to embodiments of the present inventive concepts, the light source driving device is directly compatible with a ballast stabilizer by having electrical characteristics similar to those of a fluorescent lamp.

Also, an illuminating apparatus having the foregoing light source driving device can be obtained.

Advantages and effects of the present inventive concepts are not limited to the foregoing content and any other technical effects not mentioned herein may be easily understood by a person skilled in the art from the foregoing description.

While the present inventive concepts have been shown and described in connection with particular embodiments, it will be apparent to those skilled in the art that modifications and variations can be made without departing from the spirit and scope of the inventive concepts as defined by the appended claims.

What is claimed is:

1. A light source driving device comprising:
   a transformer including a primary winding part including first and second external input terminals configured to receive external power from a ballast stabilizer and a coil having an impedance level set to allow the ballast stabilizer to output a normal amount of power, and a secondary winding part electromagnetically coupled to the primary winding part to transform the received external power;
   a rectifying diode rectifying output power from the secondary winding part of the transformer;
   a filter having an input terminal and an output terminal outputting light source driving power, configured to deliver rectified power received from the rectifying diode at the input terminal when the rectifying diode is turned on to the output terminal thereof, and storing a partial amount of the rectified power; and
   an open loop preventing circuit providing a closed loop to the filter such that power stored in the filter is applied to the output terminal when the rectifying diode is turned off.

2. The light source driving device of claim 1, wherein an impedance level of the coil set to allow the ballast stabilizer to output a normal amount of power is obtained by using Equation 1:

$$Z_x = \frac{V_{lamp}}{I_{lamp}} \quad \text{[Equation 1]}$$

where $V_{lamp}$ is a voltage output when the ballast stabilizer is in a state of outputting normal power, and $I_{lamp}$ is a current output when the ballast stabilizer is in a state of outputting normal power.

3. The light source driving device of claim 1, wherein impedance of the coil ranges from about 700Ω to about 800Ω.

4. The light source driving device of claim 1, wherein the filter is a low pass filter (LPF).

5. The light source driving device of claim 1, wherein the open loop preventing circuit includes a free-wheeling diode.

6. The light source driving device of claim 1, further comprising:
   a thermistor connected to at least one of the first and second external input terminals of the primary winding part so as to be connected in series with the primary winding part.

7. The light source driving device of claim 6, further comprising:
   a switch connected in parallel with the thermistor.

8. The light source driving device of claim 1, further comprising:
   a resistor connected to the external input terminal of the primary winding part so as to be connected in series with the primary winding part; and
   a switch connected in parallel with the resistor,
   wherein impedance of the resistor is set to allow the ballast stabilizer to output ignition power.

9. The light source driving device of claim 1, wherein the primary winding part further includes third and fourth external input terminals, and
   the light source driving device further comprises first and second potential difference generating circuits respectively generating a potential difference between the first and third external input terminals and a potential difference between the second and fourth external input terminals.

10. The light source driving device of claim 9, wherein the first and second potential difference generating circuits are first and second sub-coils, respectively.

11. The light source driving device of claim 1, further comprising:
    a DC/DC converter receiving light source driving power from an output terminal of the filter and outputting regulated light source driving power.

12. The light source driving device of claim 11, wherein the DC/DC converter is configured according to any one of boost, buck, buck-boost, and fly-back schemes.

13. The light source driving device of claim 1, further comprising:
    a linear regulator receiving light source driving power from the output terminal of the filter and outputting regulated light source driving power.

14. An illuminating apparatus comprising:
    a socket including an input terminal receiving external power from a ballast stabilizer;
    a housing coupled to the socket;
    a plate installed within the housing and including a light source driving device; and
    a light source mounted on the plate and including at least one light emitting diode (LED) receiving light source driving power from the light source driving device,
    wherein the light source driving device comprises:
       a transformer including a primary winding part including first and second external input terminals configured to receive external power from the socket and a coil having an impedance level set to allow the ballast stabilizer to output a normal amount of power, and a secondary winding part electromagnetically coupled to the primary winding part to transform the received external power;
       a rectifying diode rectifying output power from the secondary winding part of the transformer;

a filter having an input terminal and an output terminal outputting light source driving power, configured to deliver rectified power received from the rectifying diode at the input terminal thereof when the rectifying diode is turned on to the output terminal thereof, and storing a partial amount of the rectified power; and an open loop preventing circuit providing a closed loop to the filter such that power stored in the filter is applied to the output terminal when the rectifying diode is turned off.

15. The illuminating apparatus of claim 14, wherein the socket comprises two input terminals and disposed in each of two end portions of the illuminating apparatus.

16. A light source driving device for driving at least one light emitting diode (LED) using external alternating current (AC) power received from a ballast stabilizer configured for driving a fluorescent lamp, the light source driving device comprising:

a transformer circuit configured to receive the external AC power from the ballast stabilizer, and to output transformed AC power having reduced voltage amplitude for driving the at least one LED, wherein the transformer has a variable input impedance configured to have a high input impedance value at a time of initial driving of the transformer circuit by the ballast stabilizer and to decrease from the high input impedance value following the time of initial driving;

a rectifying diode configured to rectify the transformed AC power output from the transformer circuit into rectified direct current (DC) power; and a filter configured to low pass filter the rectified DC power from the rectifying diode, and to drive the at least one LED with the filtered rectified DC power.

17. The light source driving device of claim 16, wherein the transformer includes an input winding configured to receive the external AC power from the ballast stabilizer, and an output winding magnetically coupled to the input winding and configured to output the transformed AC power having reduced voltage amplitude for driving the at least one LED.

18. The light source driving device of claim 16, wherein the filter comprises a series interconnection of an inductor and a capacitor, and the filter drives the at least one LED with a voltage across the capacitor.

19. The light source driving device of claim 18, wherein the filter further comprises a diode electrically connected across the series interconnection of the inductor and the capacitor.

* * * * *